US008520591B2

(12) United States Patent
Iimori

(10) Patent No.: US 8,520,591 B2
(45) Date of Patent: Aug. 27, 2013

(54) MOBILE RADIO TERMINAL AND RADIO COMMUNICATION METHOD

(75) Inventor: Eiji Iimori, Fuchu (JP)

(73) Assignee: Fujitsu Mobile Communications Limited, Kawasaki (JP)

(*) Notice: Subject to any disclaimer, the term of this patent is extended or adjusted under 35 U.S.C. 154(b) by 874 days.

(21) Appl. No.: 12/488,770

(22) Filed: Jun. 22, 2009

(65) Prior Publication Data

US 2010/0195568 A1 Aug. 5, 2010

(30) Foreign Application Priority Data

Jan. 30, 2009 (JP) ................................ 2009-020695

(51) Int. Cl.
*H04Q 7/00* (2006.01)

(52) U.S. Cl.
USPC ........................................................ 370/328

(58) Field of Classification Search
None
See application file for complete search history.

(56) References Cited

U.S. PATENT DOCUMENTS

| | | | |
|---|---|---|---|
| 6,959,010 B1* | 10/2005 | Bahrenburg et al. | 370/503 |
| 7,315,524 B2 | 1/2008 | Ohmi et al. | |
| 7,444,142 B2* | 10/2008 | Roberts et al. | 455/418 |
| 7,706,336 B2* | 4/2010 | Sheynman et al. | 370/338 |
| 7,885,670 B2* | 2/2011 | Gao et al. | 455/458 |
| 7,957,342 B2 | 6/2011 | Ohmi et al. | |
| 7,970,414 B1* | 6/2011 | Werden et al. | 455/456.1 |
| 8,068,446 B2* | 11/2011 | Noh et al. | 370/311 |
| 8,126,464 B2* | 2/2012 | Aoyama | 455/436 |
| 8,249,591 B2* | 8/2012 | Tod et al. | 455/434 |
| 8,271,024 B1* | 9/2012 | Sylvain et al. | 455/552.1 |
| 2002/0118662 A1* | 8/2002 | Sheynman et al. | 370/338 |
| 2003/0218995 A1* | 11/2003 | Kim et al. | 370/318 |
| 2005/0101350 A1* | 5/2005 | Wang | 455/558 |
| 2008/0125043 A1* | 5/2008 | Karmanenko et al. | 455/41.2 |
| 2008/0253332 A1* | 10/2008 | Ore et al. | 370/331 |
| 2008/0305831 A1* | 12/2008 | Krishnan et al. | 455/556.2 |
| 2008/0313300 A1* | 12/2008 | Alanara et al. | 709/208 |
| 2009/0003477 A1* | 1/2009 | Nishio et al. | 375/260 |
| 2009/0023448 A1* | 1/2009 | Attar et al. | 455/436 |
| 2009/0124249 A1* | 5/2009 | Young et al. | 455/422.1 |
| 2009/0131052 A1* | 5/2009 | Hakola et al. | 455/435.2 |
| 2009/0221293 A1* | 9/2009 | Petrovic et al. | 455/450 |
| 2009/0253426 A1* | 10/2009 | Qiu et al. | 455/426.1 |
| 2009/0280823 A1* | 11/2009 | Petrovic et al. | 455/453 |
| 2010/0009676 A1* | 1/2010 | Cormier et al. | 455/426.1 |
| 2010/0046477 A1* | 2/2010 | Marin et al. | 370/332 |

(Continued)

FOREIGN PATENT DOCUMENTS

| | | | |
|---|---|---|---|
| JP | 2007-110607 A | 4/2007 | |
| JP | 2007-116561 A | 5/2007 | |

(Continued)

OTHER PUBLICATIONS

Erik Dahlman, "3G Evolution: HSPA and LTE for Mobile Broadband", Academic Press, 2007, pp. 371-389.

(Continued)

*Primary Examiner* — Hassan Phillips
*Assistant Examiner* — Prenell Jones
(74) *Attorney, Agent, or Firm* — Maschoff Brennan

(57) ABSTRACT

A mobile radio terminal UE performs starting PNG, detecting a best cell, and starting generation of Long Code and receives various types of messages from a 1×RTT CS Access on the basis of System Information supplied from an E-UTRAN.

10 Claims, 9 Drawing Sheets

(56) References Cited

U.S. PATENT DOCUMENTS

| | | | |
|---|---|---|---|
| 2010/0178919 A1* | 7/2010 | Deepak et al. | 455/435.2 |
| 2010/0189035 A1 | 7/2010 | Pehrsson et al. | |
| 2010/0202379 A1* | 8/2010 | Luo et al. | 370/329 |
| 2010/0210258 A1* | 8/2010 | Nylander et al. | 455/422.1 |
| 2010/0216474 A1* | 8/2010 | Park et al. | 455/436 |
| 2010/0272087 A1* | 10/2010 | Zhang et al. | 370/338 |
| 2010/0296419 A1* | 11/2010 | Kim et al. | 370/297 |
| 2010/0317357 A1* | 12/2010 | Miki et al. | 455/450 |
| 2011/0013530 A1* | 1/2011 | Rinne et al. | 370/252 |
| 2011/0069667 A1* | 3/2011 | Grovlen et al. | 370/329 |
| 2011/0090895 A1* | 4/2011 | Du | 370/345 |
| 2011/0206060 A1 | 8/2011 | Ohmi et al. | |
| 2011/0244869 A1* | 10/2011 | Olofsson et al. | 455/442 |
| 2012/0140720 A1* | 6/2012 | Nishio et al. | 370/329 |

FOREIGN PATENT DOCUMENTS

| | | |
|---|---|---|
| JP | 2007-529157 A | 10/2007 |
| JP | 2009-519636 A | 5/2009 |
| JP | 2010-531566 A | 9/2010 |
| WO | 2007/068304 A1 | 6/2007 |
| WO | 2009/000318 A1 | 12/2008 |

OTHER PUBLICATIONS

3GPP TS 23.401, V8.3.0, Release 8, 2008, pp. 12-17.
3GPP TS 23.402, V8.3.0, Release 8, 2008, pp. 12-24.
3GPP TS 36.300, V8.6.0, Release 8, 2008, pp. 57-61.
JP Office Action mailed on Jan. 15, 2013 in application No. 2009-020695.
System Information Blocks,,Antipolis, Sophia,Ericsson, Sytem Information Blocks, TSG-RAN Working Group2 (Radio layer 2 and Radio layer 3), 3GPP, TSGR2#6(99)817, Aug. 16-20, 1999.

* cited by examiner

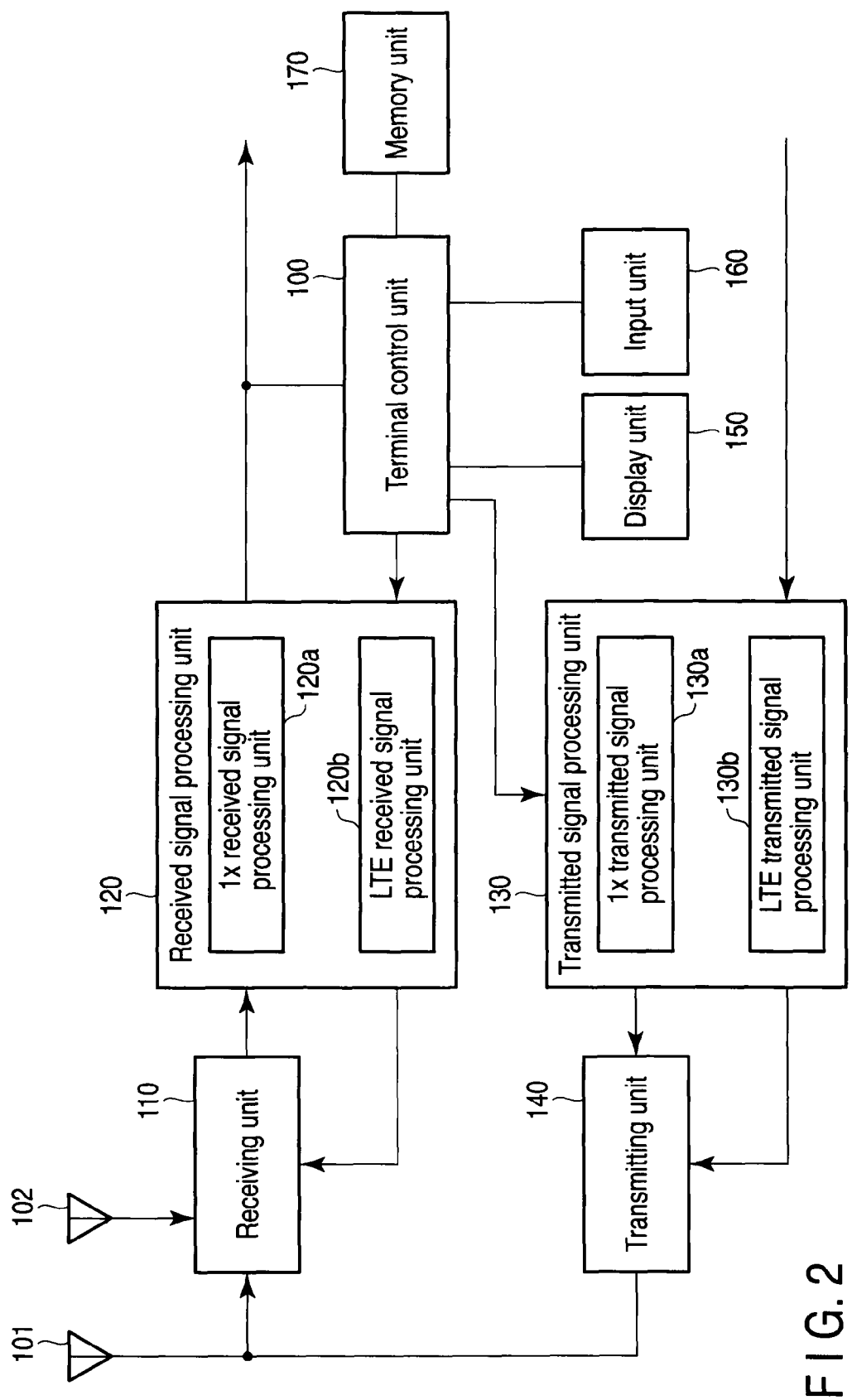
F I G. 2

| Information Element | Channel bandwidth | | | | | | | Comment |
|---|---|---|---|---|---|---|---|---|
| | 1.4 MHz | 3 MHz | 5 MHz | 10 MHz | 15 MHz | 20 MHz | | |
| SIB3 periodicity | 64 | 64 | 32 | 32 | 32 | 32 | | |
| SIB4 periodicity | 128 | 128 | 64 | 64 | 64 | 64 | | |
| SIB5 periodicity | 128 | 128 | 64 | 64 | 64 | 64 | | |
| SIB6 periodicity | 128 | 128 | 64 | 64 | 64 | 64 | | |
| SIB7 periodicity | 128 | 128 | 64 | 64 | 64 | 64 | | |
| SIB8 periodicity | 128 | 128 | 64 | 64 | 64 | 64 | | |
| prach-ConfigurationIndex in SIB2 | FFS | FFS | 3 | FFS | FFS | FFS | | Typical value in real network |
| prach-HoppingOffset | FFS | FFS | 4 | FFS | FFS | FFS | | Typical value in real network |
| nRB-CQI in SIB2 | FFS | FFS | 3 | FFS | FFS | FFS | | Selected based on typical maximum number of UEs. |
| srsBandwidthConfiguration in SIB2 | FFS | FFS | bw1 (mSRSb,Nb)=(20,1),(4,5),(4,1),(4,1) | FFS | FFS | FFS | | Selected in accordance with pucch-ResourceSize |
| measurementBandwidth in SIB5 | FFS | FFS | mbw25 (25 resource blocks) | FFS | FFS | FFS | | |

F I G. 4

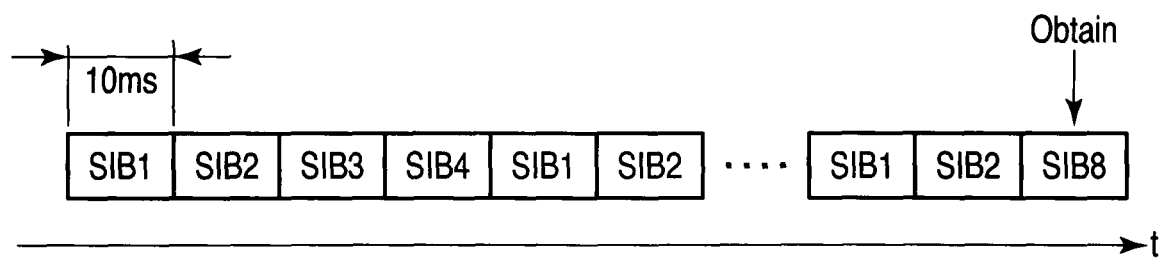
F I G. 5
| Cell ID1 | SIB8 | T1 |
| --- | --- | --- |
| Cell ID3 | SIB8 | T3 |
| Cell ID7 | SIB8 | T7 |
| ⋮ | ⋮ | ⋮ |
F I G. 9

```
SystemInformationBlockType8 information element
-- ASN1 START
SystemInformationBlockType8 ::=           SEQUENCE {
    cdma2000-SystemTimeInfo               CDMA2000-SystemTimeInfo      OPTIONAL,           System Timing information
    searchWindowSize                      INTEGER (0..15)
    hrpd-Parameters                       SEQUENCE {
        hrpd-PreRegistrationInfo              HRPD-PreRegistrationInfo,
        hrpd-CellReselectionParameters        SEQUENCE {
            hrpd-BandClassList                HRPD-BandClassList,
            hrpd-NeighborCellList             HRPD-NeighborCellList
        }                                     OPTIONAL,
    }                                     OPTIONAL,
    oneXRTT-Parameters                    SEQUENCE {
        oneXRTT-CSFB-RegistrationInfo         OneXRTT-CSFB-RegistrationInfo    OPTIONAL,   -- Need OP
        oneXRTT-LongCodeState                 BIT STRING { SIZE (42) }         OPTIONAL,   -- Need OP      Long Code information
        oneXRTT-CellReselectionParameters     SEQUENCE {
            oneXRTT-BandClassList             oneXRTT-BandClassList,
            oneXRTT-NeighborCellList          oneXRTT-NeighborCellList                                     Neighbor Cell List information
        }                                     OPTIONAL,
    }                                     OPTIONAL,
    ...
```

F I G. 6

MOBILE RADIO TERMINAL AND RADIO COMMUNICATION METHOD

CROSS-REFERENCE TO RELATED APPLICATIONS

This application is based upon and claims the benefit of priority from prior Japanese Patent Application No. 2009-020695, filed Jan. 30, 2009, the entire contents of which are incorporated herein by reference.

BACKGROUND OF THE INVENTION

1. Field of the Invention

The present invention relates to a mobile radio terminal used for, for example, a moving body.

2. Description of the Related Art

In radio communication systems of, for example, a mobile telephone system and a wireless LAN, OFDMA (Orthogonal Frequency Multiple Access) and CDMA (Code Division Multiple Access) are employed as communication schemes. OFDM (Orthogonal Frequency Division Multiplexing) is proof against interference or disturbance and is therefore noticed.

In 3GPP LTE (Long Term Evolution) employing the OFDM (see, for example, Erik Dahlman "Academic Press", 2007, pp. 277-369, 3GPP TS23.401, 3GPP TS23.402, 3GPP TS36.300), entire data over a network are handled as packets, and the packet communication scheme using VoIP (Voice over IP) is employed as the speech communication.

In the 3GPP LTE, however, the speech communication based on the line switching system which has been employed in the 2G/3G system is not quite used, but performing the speech communication by using the 2G/3G system of the existing line switching system at the time of transmitting and receiving speech as circumstances demand, is studied.

In the currently studied system, if a mobile station in a standby status receives speech over an LTE network (hereinafter called E-UTRAN network), the mobile station supplies the speech to a 3G network (hereinafter called 1×TT network) and then becomes in a communication status with the 1×TT network in predetermined steps.

In the above steps, however, information indicating the system of the transition target (1×TT network) and a frequency thereof are merely described in Redirection Information Element notified to the mobile station from the E-UTRAN network. For this reason, the mobile station needs to perform a process of capturing the system from the first step, over the 1×TT network, and it takes much time to establish a communication link and much delay time occurs before the communication starts. Since 2 to 3 seconds are generally required for this process, a delay which is more than about ten times as great as that in a general case occurs in consideration of the matter that it takes 100 ms to establish the conversation in the receiving status over the 1×TT network.

Upon switching the E-UTRAN network to the 1×TT network, preliminarily measuring the receiving environment of the 1×TT network serving as the transition target and performing the transition by CCO (Cell Change Order) which informs the E-UTRAN of the measurement result can be considered. In this process, however, the 1×TT is not supported under the current 3GPP standards.

The conventional mobile radio terminal corresponding to a plurality of communication system has a problem that it takes much time to transit to the CDMA communication system under instructions from the LTE communication system.

BRIEF SUMMARY OF THE INVENTION

The present invention has been accomplished to solve the above-described problems. The object of the present invention is to provide a mobile radio terminal and radio communication method, capable of transiting to a communication system in a CDMA mode, efficiently in a short time, under an instruction from a communication system in an LTE mode.

To achieve the object, the present invention is a mobile radio terminal comprising:

a first communication unit which makes radio communications in LTE mode with a first radio base station of a first system;

a second communication unit which makes radio communications in CDMA mode with a second radio base station of a second system;

an information obtaining unit which obtains System Information Block 8 as system information of the second system by means of the first communication unit; and a system transition unit which controls the second communication unit to make communications with the second radio base station on the basis of the system information if the first communication unit receives an instruction from the first system.

According to the present invention, system information of the second system making radio communications in the CDMA mode, System Information Block 8 is obtained by means of the first communication unit which makes radio communications in the LTE mode with the first radio base station of the first system, and communications with the second radio base station are made on the basis of the system information if an instruction from the first system is received.

The present invention can therefore provide a mobile radio terminal and radio communication method, capable of transiting to a communication system in the CDMA mode, efficiently in a short time, under an instruction from a communication system in the LTE mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of the mobile radio terminal employed in the radio communication system shown in FIG. 1;

FIG. 4 is an illustration showing an example of system information supplied to the mobile radio terminal from E-UTRAN shown in FIG. 1;

FIG. 5 is an illustration showing a situation in which the system information shown in FIG. 4 is supplied irregularly;

FIG. 6 is an illustration showing an example of the system information shown in FIG. 4;

FIG. 9 is an illustration showing a plurality of items of the system information stored in the mobile radio terminal, in the operation sequence shown in FIG. 8.

DETAILED DESCRIPTION OF THE INVENTION

Embodiments of the present invention are explained below with reference to the accompanying drawings.

The embodiments relate to mobile radio terminal UE, i.e. a mobile station. The mobile radio terminal UE is capable of performing communications in two or more different radio connection modes.

In the following descriptions, for example, the mobile radio terminal UE corresponds to two radio connection modes, CDMA2000 1× mode (hereinafter called 1× mode) and LTE (Long Term Evolution) mode.

The 1× mode is capable of offering speech communication service and low-speed packet communication service at 100 kbps or lower. On the other hand, the LTE mode offers high-speed packet service at approximately 2 Mbps to 20 Mbps by packet switching connection and is also capable of offering the speech communication service by VoIP (Voice over Internet Packet).

In each of the modes, mutually different available frequencies are determined which are defined in the following manners. The 1× mode is assigned frequency f1$d$ as a frequency of a down link directed from the base station to the mobile radio terminal UE and frequency f1$u$ as a frequency of an up link. The LTE mode is assigned frequency f2$d$ as a frequency of a down link directed from the base station to the mobile radio terminal UE and frequency f2$u$ as a frequency of an up link.

In the radio communication system, a base station 1×-BS transmitting and receiving a 1×-mode radio signal and a base station LTE-BS transmitting and receiving an LTE-mode radio signal are installed to form radio zones called cells, respectively. A base station transmitting and receiving both the 1×-mode radio signal and the LTE-mode radio signal is also present.

The base station 1×-BS corresponding to the 1× mode is accommodated in a 1×RTT access network based on, for example, 3GPP2 A.S0001-A and A.S0008-C. The base station LTE-BS corresponding to the LTE mode is accommodated in an E-UTRAN access network based on, for example, 3GPP TS23.401 v8.2.0 and 3GPP TS23.402 v8.2.0.

Figure 1:
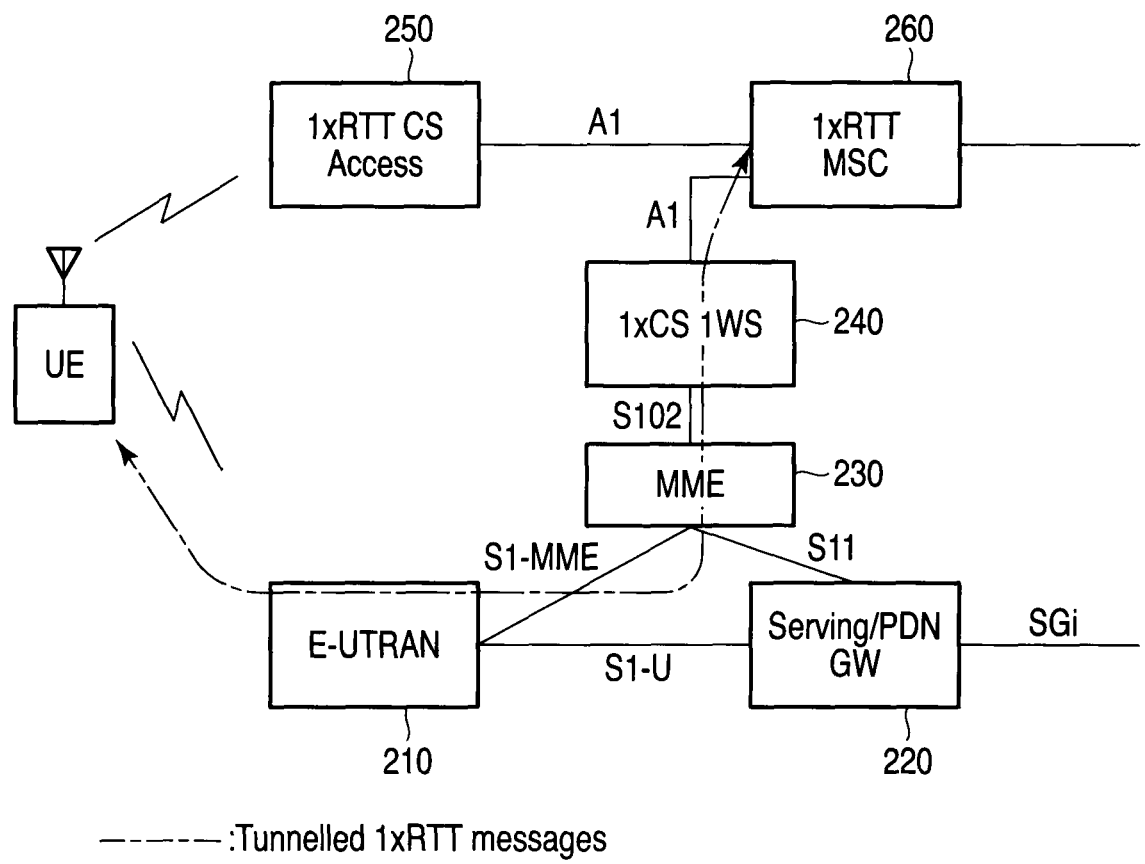
FIG. 1 is an illustration showing a configuration of a radio communication system employing a mobile radio terminal according to the present invention.

FIG. 1 shows a partial configuration of a radio communication system employing the mobile radio terminal UE. The system is based on 3GPP 23.272 v8.2.0, and comprises an E-UTRAN 210, a Serving/PDN GW 220, a MME 230, a 1×CS IWS node 240, a 1×RTT CS Access 250 and a 1×RTT MSC 260.

The E-UTRAN 210 is infrastructure in which the mobile radio terminal UE performs radio connections in the LTE mode, and contains the base station LTE-BS, E-NodeB and the like.

The Serving/PDN GW (Public Data Network Gateway) 220 is a gateway which makes a connection between a serving network and a roaming network (PDN) and urges the mobile radio terminal UE to be connected to the Internet via the E-UTRAN 210.

The MME (Mobility Management Entity) 230 has a mobility management function of managing the mobility of the mobile radio terminal UE connected via the E-UTRAN 210. The 1×CS IWS (Inter Work System) node 240 has an inter working solution function of supporting CS-FALL BACK (Circuit Switched Fallback) between 1×RTT and E-UTRAN, and supplies identification information of 1×-mode cell located in the vicinity of the E-UTRAN 210 and control information of the 1×-mode system to the E-UTRAN 210.

The 1×RTT CS Access 250 is infrastructure in which the mobile radio terminal UE performs radio connection in the 1× mode, and comprises a 1×-mode BTS (Base Transceiver Station), i.e. a base station 1×-BS and a BSC (Base Station Controller) repeating a network with the 1×-mode BTS.

The 1×RTT MSC (Mobile Switching Center) 260 is a switching center of the 1×-mode mobile communication network.

FIG. 2 shows a configuration of the mobile radio terminal UE. As shown in the figure, the mobile radio terminal UE comprises a transmitting and receiving antenna 101, a receiving antenna 102, a terminal control unit 100, a receiving unit 110, a received signal processing unit 120, a transmitted signal processing unit 130, and a transmitting unit 140. In addition, the mobile radio terminal UE comprises a display unit 150 which displays characters and images, an input unit 160 which accepts user requests and number inputs, a battery and a power supply unit which supply a driving power, a microphone which inputs transmitted speech, a speaker which outputs received speech, and a memory unit 170.

The radio signals (frequencies f1$d$, f2$d$) transmitted from the base stations 1×-BS, LTE-BS are received by the transmitting and receiving antenna 101 and the receiving antenna 102. The received radio signals downconverted into baseband received signals by the receiving unit 110. A local signal used for the downconversion is oscillated with a frequency corresponding to the communication mode directed by the received signal processing unit 120 and the radio signal to be received (either frequency f1$d$ or f2$d$) is thereby selected.

The received signal processing unit 120 comprises a 1× received signal processing unit 120*a* which corresponds to the 1× mode and processes the signal received from the base station 1×-BS, and a LTE received signal processing unit 120*b* which corresponds to the LTE mode and processes the signal received from the base station LTE-BS.

Then, the received signal processing unit 120 notifies the receiving unit 110 of the communication mode directed by the terminal control unit 100, and initiates either the 1× received signal processing unit 120*a* or the LTE received signal processing unit 120*b* that corresponds to the communication mode.

Each of the 1× received signal processing unit 120*a* and the LTE received signal processing unit 120*b* performs the signal processing in the corresponding communication mode. If initiated, the received signal processing unit demodulates and decodes the baseband received signal by the signal processing to obtain the received data.

The transmitted signal processing unit 130 comprises a 1× transmitted signal processing unit 130*a* which corresponds to the 1× mode and generates a signal to be transmitted to the base station 1×-BS, and a LTE transmitted signal processing unit 130*b* which corresponds to the LTE mode and generates a signal to be transmitted to the base station LTE-BS.

Then, the transmitted signal processing unit 130 notifies the transmitting unit 140 of the communication mode directed by the terminal control unit 100, and initiates either the 1× transmitted signal processing unit 130a or the LTE transmitted signal processing unit 130b that corresponds to the communication mode.

Each of the 1× transmitted signal processing unit 130a and the LTE transmitted signal processing unit 130b performs the signal processing in the corresponding communication mode. If initiated, the transmitted signal processing unit encodes and modulates the transmitted signal to generate the baseband transmitted signal.

The transmitting unit 140 oscillates the local signal of the frequency corresponding to the communication mode notified by the transmitted signal processing unit 130 and upconverts the baseband transmitted signal into the radio frequency with the local signal. The radio signal to be transmitted (frequency f1$u$ or f2$u$) is thereby selected. The selected radio signal is radiated into space by means of the transmitting and receiving antenna 101.

The memory unit 170 stores control programs and control data of the terminal control unit 100, and also stores communication parameters (for example, SIB8, information on the obtaining time thereof and the like) received by the received signal processing unit 120.

The terminal control unit 100 controls all of the units in the mobile radio terminal UE. The terminal control unit 100 controls all of the units to perform communications in the communication mode according to the request directed by the user by means of the input unit 160, and performs processes such as selecting the communication mode, registering positions, awaiting an incoming call and the like in accordance with a standby process, an incoming call process to be described later. Due to these processes, when the terminal control unit 100 is notified of the incoming signal in the LTE mode and directed to transfer to the 1× mode by the E-UTRAN 210, the terminal control unit 100 transfers to the 1× mode and accepts notification of the incoming signal from the 1×RTT CS Access 250.

Figure 3:
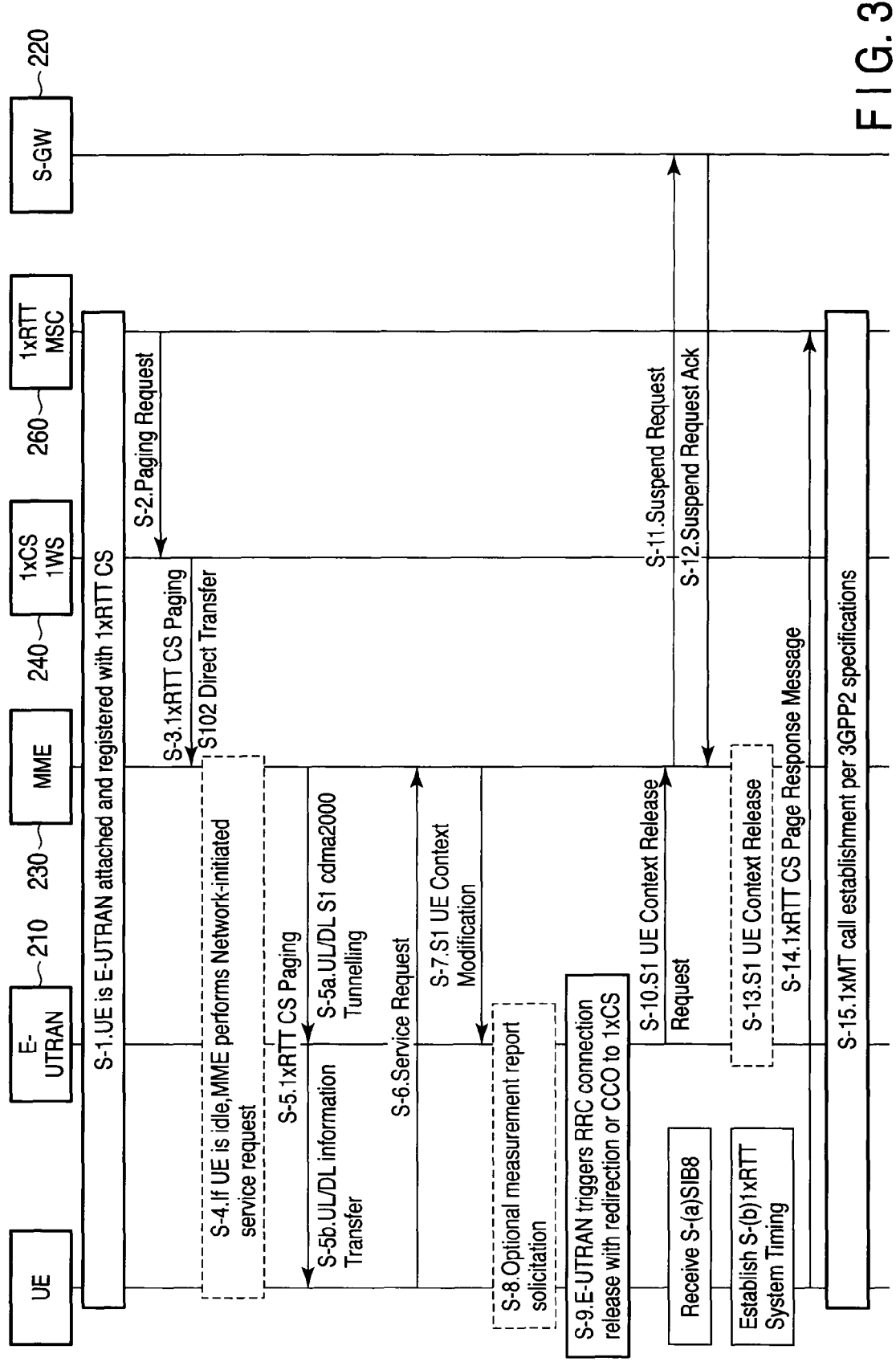
FIG. 3 is an illustration showing an operation sequence of the radio communication system shown in FIG. 1.

Next, operations of the mobile radio terminal UE having the above-described configuration are explained. In the following descriptions, operations from generation of an incoming signal to start of conversation in the 1× mode or LTE mode are omitted, but operations relating to the present invention, i.e., operations of receiving notification of an incoming signal in the LTE mode, transiting from the LTE mode to the 1× mode and accepting the incoming signal are described. FIG. 3 is an illustration of sequence, which is based on 3GPP23.272 Ver.8.2.0.

Operation control of the mobile radio terminal UE is implemented by controlling the received signal processing unit 120, a transmitted signal processing unit 130 mainly by the terminal control unit 100. In an initial state of the following descriptions, the LTE received signal processing unit 120b and the LTE transmitted signal processing unit 130b function to perform communications by means of the E-UTRAN 210.

In sequence S-1, attachment (registration) to the E-UTRAN 210 is performed for the mobile radio terminal UE, and pre-registration using the 1×RTT CS defined in section B.2.1.1. of 3GPP23.272 Ver.8.2.0 is performed.

In sequence S-2, the 1×RTT MSC 260 transmits a paging request to the 1×CS IWS node 240.

In sequence S-3, the 1×CS IWS node 240 transfers the paging request to the MME 230 through S102 tunnel.

In sequence S-4, when the mobile radio terminal UE is in an idle state, the MME 230 performs a Network-initiated service request procedure. This operations aims to make the mobile radio terminal UE in an ACTIVE state before the mobile radio terminal UE receives the paging request to the 1×RTT CS.

In sequence S-5 (S-5a, S-5b), the MME 230 transfers the 1×RTT CS paging request to the mobile radio terminal UE by means of the E-UTRAN 210.

In sequence S-6, the mobile radio terminal UE transmits Service Request (CS Fullback Indicator) to the MME 230.

In sequence S-7, the MME 230 transmits S1-AP, i.e., UE Context Modification (UE capabilities, CS Fullback Indicator) to indicate that the mobile radio terminal UE transfers from the E-UTRAN to 1×RTT.

In sequence S-8, as an opinion, the E-UTRAN 210 requests Measurement Report from the mobile radio terminal UE and determines that 1×RTT cell of target should be performed by CS Fullback.

In sequence S-9, the E-UTRAN 210 causes RBC connection release to be formed by redirection to the 1×CS or Inter-RAT CCO (Cell Change Order) to be formed for a 1×RTT Neighbor Cell. In Rel. 8, CCO to the 1×RTT is not performed.

In sequence S-(a), the mobile radio terminal UE (terminal control unit 100) obtains 1×-mode System Information transmitted from the E-UTRAN 210 via BCH transmitted from the E-UTRAN 210. The System Information includes information shown in FIG. 4. The E-UTRAN 210 preliminarily holds the System Information of neighboring 1×RTT CS Access 250. The System Information is supplied from the 1×CS IWS node 240.

As for the System Information, various types of SIB (System Information Block) are irregularly transmitted from the E-UTRAN 210 by means of BCH as shown in FIG. 5. The mobile radio terminal UE (terminal control unit 100) particularly obtains SIB8 of the transmitted SIB and urges the memory unit 170 to store the information of SIB8 and the obtaining timing (LTE Frame: 10 ms unit). SIB8 includes System Timing information, Long Code information and Neighbor Cell List information as shown in FIG. 6.

The System Timing information is information included in CDMA2000-S systemTimeInfo described in the 3GPP2 C.S0002-A, and includes information indicating GPS (Global Positioning System) standard time with which the 1×-mode base station apparatus, i.e., the 1×RTT CS Access 250 synchronizes.

The Long Code information is information included in oneXRTT-LongCodeState described in the 3GPP2 C.S0002-A and information counted by a 42-bit counter which has started at the starting point of Jan. 6, 1980. Since the transmitted from the 1×RTT CS Access 250 is scrambled with the Long Code information, the Long Code information must be set correctly to receive the transmitted information correctly.

The Neighbor Cell List information is identification information of the 1×-mode cell located in the vicinity of the E-UTRAN 210. In other words, the SIB8 includes information necessary for the mobile radio terminal UE to synchronize with the 1×RTT CS Access 250 which is to transit. Conventionally, these information items have been obtained by the mobile radio terminal UE performing the initial synchronization process.

In sequence S-(b), the mobile radio terminal UE performs RAT (Radio Access Technology) Change (UTRAN→1×RTT) and, on the basis of the information of the SIB8 stored in the memory unit 170, transits from the E-UTRAN 210 to the 1×RTT CS Access 250 by a timing to which the information should be applied. In other words, the terminal control unit 100 controls the received signal processing unit 120 and the transmitted signal processing unit 130 to operate the 1× received signal processing unit 120a and the 1× transmitted signal processing unit 130a instead of the LTE received signal processing unit 120b and the LTE transmitted signal processing unit 130b.

Figure 7:
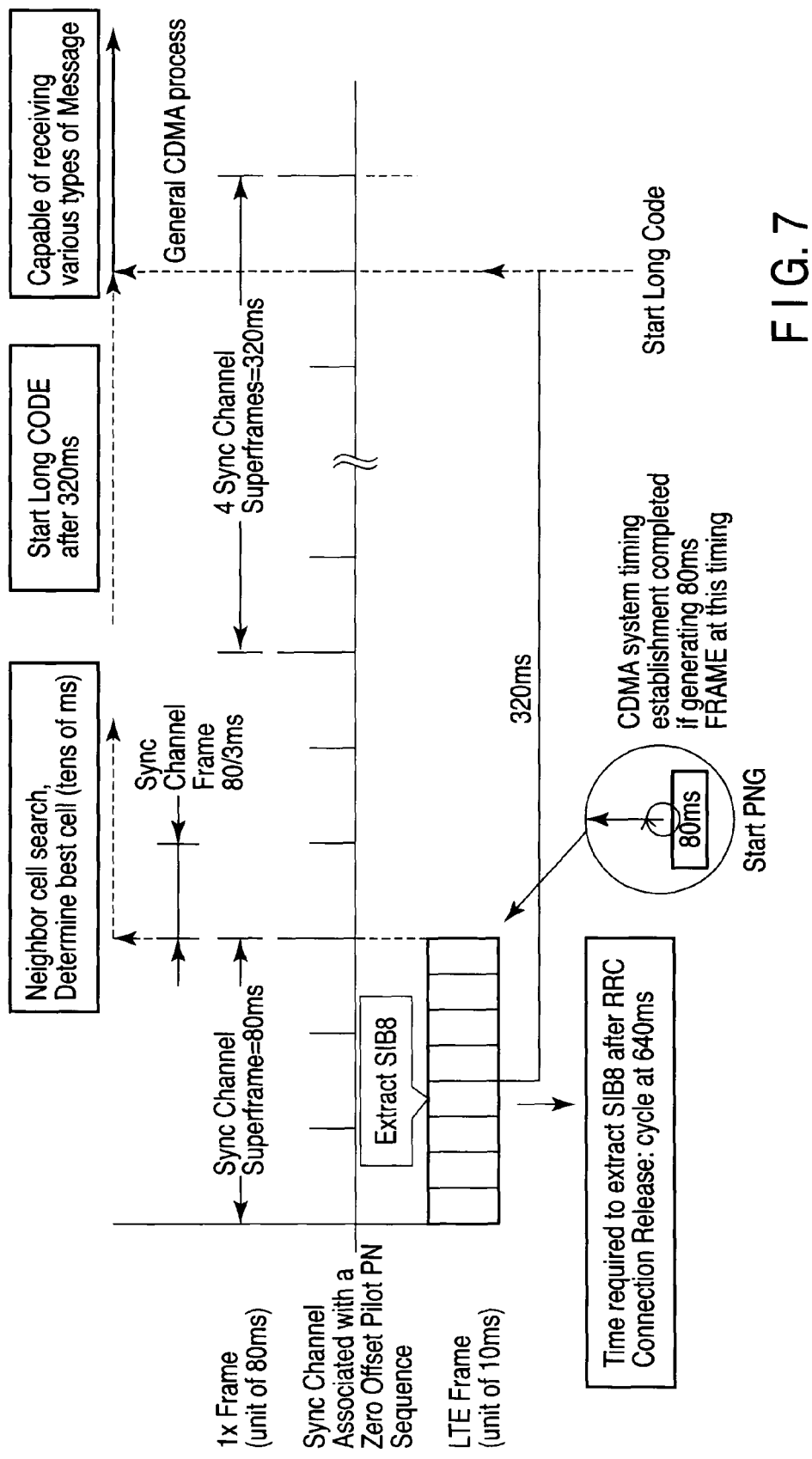
FIG. 7 is an illustration showing an operation by which the mobile radio terminal transits from E-UTRAN to 1×RTT CS Access according to the operation sequence shown in FIG. 3.

In the mobile radio terminal UE, the terminal control unit 100 urges PNG (Pseudo Noise Generator) to be initiated synchronously with 1×-mode Sync Channel Super frame (80 ms) on the basis of the timing at which the SIB8 has been obtained in sequence S-(a), as shown in FIG. 7. Synchronization of the Sync Channel and System timing synchronization (Slew Back) have been thereby completed.

Then, on the basis of the Neighbor Cell information of the SIB8 and the PNG, the terminal control unit 100 sequentially receives pilot channel signals from a plurality of neighbor cells, the 1× received signal processing unit 120a measures receiving qualities of the received signals, and the terminal control unit 100 detects the neighbor cell which is most suitable to the communications. The cell detection is completed within tens of ms. High-speed initial capture search and frequency Pull-IN are thereby completed.

The terminal control unit 100 starts generation of the Long Code based on the Long Code information of the SIB8, 320 ms (=4 Sync Channel Super frame) after the timing of obtaining the SIB8, and urges the 1× received signal processing unit 120a and the 1× transmitted signal processing unit 130a to be operated on the basis of the start of the generation. Various types of messages can be thereby received from the 1×RTT CS Access 250.

On the other hand, sequences S-10 to S-13 are performed while the sequences S-(a) and S-(b) are performed.

In sequence S-10, the E-UTRAN 210 transmits an S1 UE Context Release Request (Cause) message to the MME 230. At this time, the Cause indicates that S1 UE Context Release is brought by CS fallback to 1×RTT.

In sequence S-11, the MME 230 sets UE context in a suspended status, and transmits to the S-GW 220 a Suspend Request (IMSI) message to request suspension of an EPS bearer relating to the mobile radio terminal UE.

In sequence S-12, the S-GW 220 notifies having received the Suspend Request message and handles the mobile radio terminal UE in a suspended status. Even if downlink data arrive at the S-GW 220, in a case where the mobile radio terminal UE is in a suspended status, the S-GW 220 does not transmit a downlink data notification message to the MME 230.

In sequence S-13, the S1 UE Cotext in the E-UTRAN 210 released between the E-UTRAN 210 and the MME 230 as if it were described in the TS 23.401.

In sequence S-14, the mobile radio terminal UE has become capable of receiving various types of messages from the 1×RTT CS Access 250 in the sequence S-(b) and therefore notifies the 1×RTT CS Access 250 of having received the page by transmitting the 1×RTT Paging Response message over 1× access channel in synchronization with the 1×RTT CS Access 250. The notification is recognized by the NW, and the mobile radio terminal UE can receive the Paging information and the overhead message and maintain the access channel information obtaining link.

In sequence S-15, the mobile radio terminal UE continues performing the step of establishing the incoming signal to the mobile radio terminal UE and is capable of outgoing process by means of RACH. This step is defined in 3GPP2 A.S0013 [18]. After that, the 1× received signal processing unit 120a receives the incoming signal from the 1×RTT CS Access 250, and the terminal control unit 100 controls drive of a sounder (not shown) and notifies the user of occurrence of the incoming signal by melody sound and the like.

Once the CS service of the 1×CS domain is ended, the mobile radio terminal UE performs reselection and connects to the E-UTRAN 210 such that EPS (Evolved Packet System) service is restarted as described in section 6.5.

In the mobile radio terminal UE having the above-described configuration, starting the PNG, detecting the best cell, and starting the generation of the Long Code are performed on the basis of the System Information supplied from the E-UTRAN 210.

Therefore, since the time to be spent for high-speed initial capture search, frequency Pull-IN, Sync Channel 80 ms synchronization, and System timing synchronization Slew Back which have been conventionally performed according to RAT Change (UTRAN→1×RTT) can be reduced, the transition from the LTE mode to the 1× mode can be completed in a short time.

Figure 8:
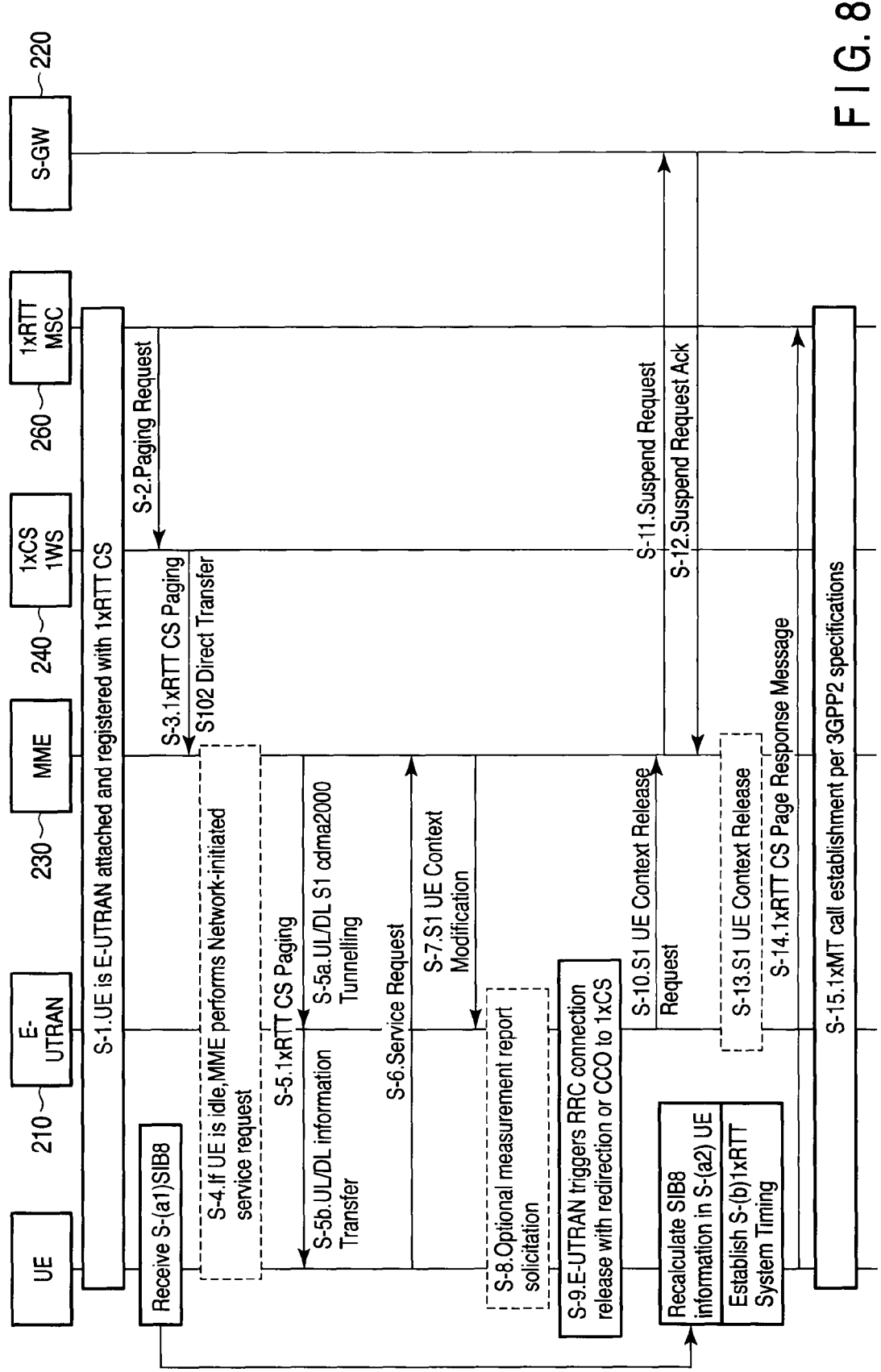
FIG. 8 is an illustration showing the operation sequence of the radio communication system shown in FIG. 1.

In the above-described embodiment, the sequence S-(a) and the sequence S-(b) are performed sequentially, but the present invention is not limited to this. The System Information (SIB8) may be obtained not only in a case where the incoming signal occurs, but also at a preset timing in preparation for the occurrence of the incoming signal, for example, a regular timing. As shown in FIG. 8, for example, sequence S-(a1) and sequence S-(a2) are performed instead of the sequence S-(a).

The sequence S-(a1) is performed regularly at an arbitrary timing prior to the sequence S-(a2) and the sequence S-(b). The mobile radio terminal UE (terminal control unit 100) obtains the 1×-mode System Information (SIB8) transmitted from the E-UTRAN 210 via the BCH sent from the E-UTRAN 210, associates the obtained information with identification information (cell ID) of eNode-B constituting the E-UTRAN as shown in FIG. 9, stores the information in the memory unit 170, and stores obtaining time information T in the memory unit 170 on the basis of the time counted by the terminal control unit 100 in association with those information items. If the mobile radio terminal UE obtains the SIB8 with the same ID, the mobile radio terminal UE updates the information with information obtained later.

After that, the mobile radio terminal UE performs the sequence S-(a2) and the sequence S-(b), starts the RAT Change (UTRAN→1×RTT) and, on the basis of the information of SIB8 stored in the memory unit 170, transits from the E-UTRAN 210 to the 1×RTT CS Access 250 by the timing at which the information should be applied.

First, in sequence S-(a2), the mobile radio terminal UE (terminal control unit 100) retrieves information associated with the identification information of eNode-B constituting the current cell E-UTRAN, of the information items stored in the memory unit 170, compares the obtaining time T included in the associated information with the time t counted by the terminal control unit 100 and obtains elapsed time ΔT.

Then, in the sequence S-(b) shown in FIG. 8, the mobile radio terminal UE (terminal control unit 100) controls the received signal processing unit 120 and the transmitted signal processing unit 130 to operate the 1× received signal processing unit 120a and the 1× transmitted signal processing unit 130a instead of the LTE received signal processing unit 120b and the LTE transmitted signal processing unit 130b.

Figure 10:
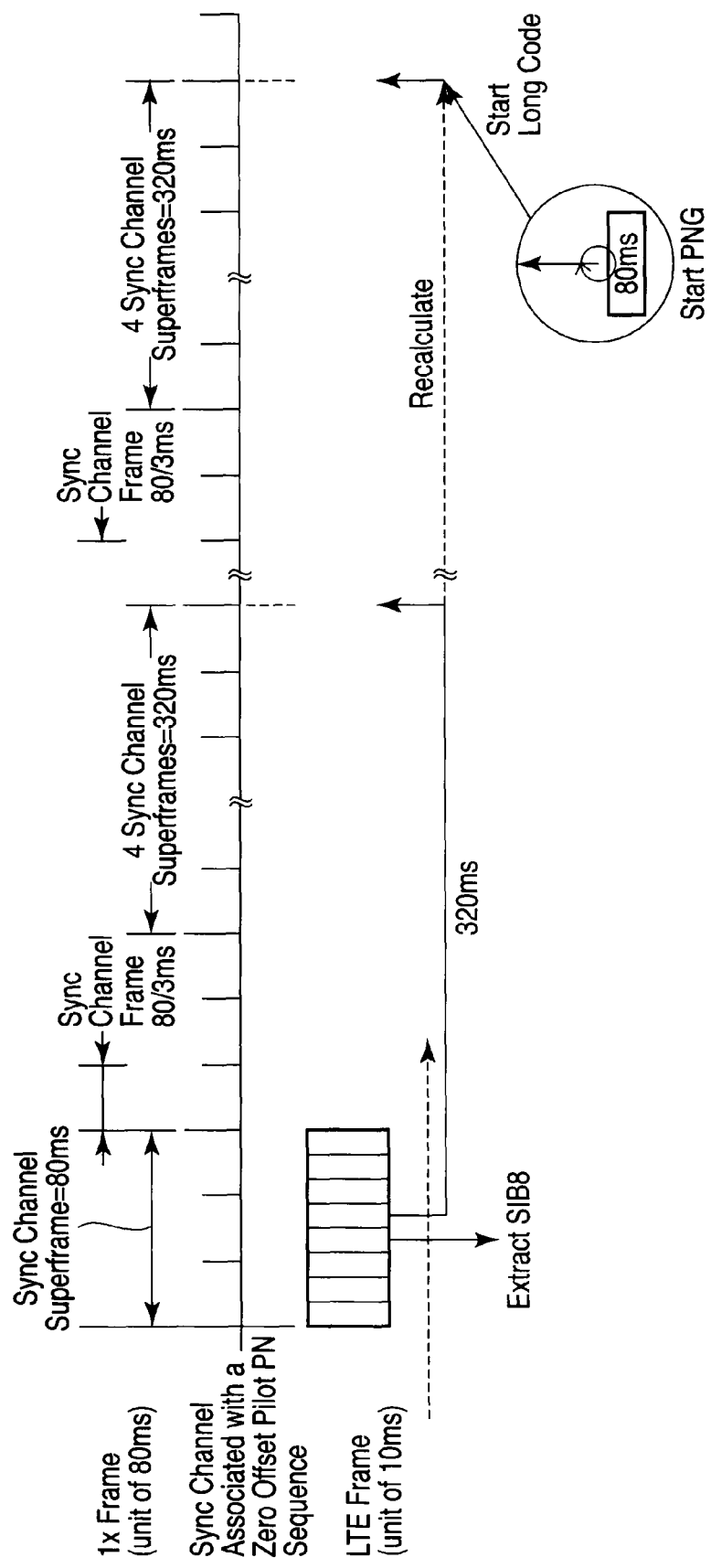
FIG. 10 is an illustration showing an operation by which the mobile radio terminal transits from E-UTRAN to 1×RTT CS Access according to the operation sequence shown in FIG. 8.

Then, the terminal control unit 100 starts the PNG in synchronization with the 1×-mode Sync Channel Super frame (80 ms) on the basis of the time T at which the SIB8 has been obtained in the sequence S-(a1) and the elapsed time ΔT obtained in the sequence S-(a2) as shown in FIG. 10. The synchronization of the Sync Channel and the System timing synchronization (Slew Back) are thereby completed.

In addition, the terminal control unit 100 starts the generation of the Long Code at the timing synchronous with the sync Channel Super frame, on the basis of the elapsed time ΔT and the Long Code information of the SIB8, and urges the 1× received signal processing unit 120*a* and the 1× transmitted signal processing unit 130*a* to be operated on the basis of the generated Long Code. Various types of messages from the 1×RTT CS Access 250 can be thereby received.

Furthermore, the terminal control unit 100 sequentially receives the pilot signals with mask information inherent to the cells associated with the Cell List, from a plurality of neighbor cells, on the basis of the Neighbor Cell List information of the SIB8 and the PNG, the 1× received signal processing unit 120*a* measures the receiving qualities of the pilot signals, and the terminal control unit 100 detects the neighbor cell which is most suitable for the communications. This cell detection is completed within tens of ms. The high-speed initial capture search and the frequency Pull-IN are thereby completed.

Thus, if the SIB8 is obtained, for example, regularly at the arbitrary timing much more previous than the start of the RAT Change (UTRAN→1×RTT), the same advantage can be obtained.

If the SIB8 is obtained at the arbitrary timing much more previous than the start of the RAT Change (UTRAN→1× RTT), it is assumed that System Frame Counter enters a new cycle before using the information (before the incoming signal occurs). For this reason, the terminal control unit 100 holds the time information corresponding to higher-order bits of the system Frame Counter and stores the elapsed time. Thus, the elapsed time after obtaining the SIB8 can be obtained even if the System Frame Counter enters a new cycle.

Instead of this, for example, the terminal control unit 100 may reflect the elapsed time on the System Timing information and the Long Code information and hold the time information every time the System Frame Counter enters a new cycle.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the present invention is applied to a case where the incoming signal occurs is described in the above-described embodiment, but can also be applied to a case where the outgoing signal occurs. In other words, if the mobile radio terminal UE requests the outgoing signal by means of the E-UTRAN 210, the terminal control unit 100 may obtain the System Information (SIB8) supplied from the E-UTRAN 210, perform starting the PNG, detecting the best cell and starting the generation of the Long Code on the basis of the obtained information, urge the 1× received signal processing unit 120*a* and the 1× transmitted signal processing unit 130*a* to be operated, transit from the LTE mode to the 1× mode, and perform the signal transmission in the 1× mode.

If the present invention is applied to the signal transmission, the System Information (SIB8) is not obtained after the transmission process is started, but may be obtained preliminarily at a predetermined timing, for example, a regular timing before the user request for transmission is generated.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal comprising:
    a first communication unit which makes radio communications in LTE mode with a first radio base station of a first system;
    a second communication unit which makes radio communications in CDMA mode with a second radio base station of a second system;
    an information obtaining unit which obtains System Information Block 8 as system information of the second system by means of the first communication unit; and
    a system transition unit which controls the second communication unit to make communications with the second radio base station on the basis of the system information including the System Information Block 8 when the first communication unit receives an instruction from the first system,
    wherein if the first communication unit receives the instruction from the first system, the system transition unit controls the second communication unit to synchronize with the second radio base station on the basis of time information included in the system information,
    wherein the System Information Block 8 includes System Timing information, Long Code information, and Neighbor Cell List information,
    wherein, on the basis of the Neighbor Cell List information, pilot channel signals are received from a plurality of neighbor cells, qualities of the received pilot channel signals are measured, and the neighbor cell which is most suitable for communication is determined, and
    wherein the system transition unit makes communications with the second radio base station on the basis of the system information such that starting a PNG and starting the generation of the Long Code are performed on the basis of the system information.

2. The mobile radio terminal according to claim 1, wherein if the first communication unit receives the instruction from the first system, the system transition unit controls the second communication unit to search for the second radio base station on the basis of cell information included in the system information.

3. The mobile radio terminal according to claim 1, further comprising:
    a memory unit which stores the system information obtained by the information obtaining unit and time information indicating a time when the system information is obtained; and
    an elapsed time detecting unit which compares the time information with a current time and obtains an elapsed time,
    wherein if the first communication unit receives the instruction from the first system, the system transition unit controls the second communication unit to make communications with the second radio base station on the basis of the elapsed time obtained by the elapsed time detecting unit and the time information and the system information stored in the memory unit.

4. The mobile radio terminal according to claim 1, wherein if the first communication unit receives an incoming signal, the system transition unit controls the second communication unit to make communications with the second radio base station and receives the incoming signal on the basis of the system information.

5. The mobile radio terminal according to claim 1, wherein the system transition unit controls the first communication unit to make transmission and, if the first communication unit receives an instruction from the first system, controls the second communication unit to make communications with the second radio base station and make transmission on the basis of the system information.

6. A radio communication method in a mobile radio terminal comprising:
   a first communication unit which makes radio communications in LTE mode with a first radio base station of a first system; and
   a second communication unit which makes radio communications in CDMA mode with a second radio base station of a second system,
   the method comprising:
   an information obtaining step of obtaining System Information Block 8 as system information of the second system by means of the first communication unit; and
   a system transition step of controlling the second communication unit to make communications with the second radio base station on the basis of the system information including the System Information Block 8 when the first communication unit receives an instruction from the first system,
   wherein if the first communication unit receives the instruction from the first system, the system transition step controls the second communication unit to synchronize with the second radio base station on the basis of time information included in the system information,
   wherein the System Information Block 8 includes System Timing information, Long Code information, and Neighbor Cell List information,
   wherein, on the basis of the Neighbor Cell List information, pilot channel signals are received from a plurality of neighbor cells, qualities of the received pilot channel signals are measured, and the neighbor cell which is most suitable for communication is determined, and
   wherein the system transition unit makes communications with the second radio base station on the basis of the system information such that starting a PNG and starting the generation of the Long Code are performed on the basis of the system information.

7. The method according to claim 6, wherein if the first communication unit receives the instruction from the first system, the system transition step controls the second communication unit to search for the second radio base station on the basis of cell information included in the system information.

8. The method according to claim 6, further comprising:
   a memory step which stores the system information obtained in the information obtaining step and time information indicating a time when the system information is obtained; and
   an elapsed time detecting step which compares the time information with a current time and obtains an elapsed time,
   wherein if the first communication unit receives the instruction from the first system, the system transition step controls the second communication unit to make communications with the second radio base station on the basis of the elapsed time obtained in the elapsed time detecting step and the time information and the system information stored in the memory step.

9. The mobile radio terminal according to claim 6, wherein if the first communication unit receives an incoming signal, the system transition step controls the second communication unit to make communications with the second radio base station and receives the incoming signal on the basis of the system information.

10. The mobile radio terminal according to claim 6, wherein the system transition step controls the first communication unit to make transmission and, if the first communication unit receives an instruction from the first system, controls the second communication unit to make communications with the second radio base station and make transmission on the basis of the system information.

* * * * *